United States Patent Office 3,554,661
Patented Jan. 12, 1971

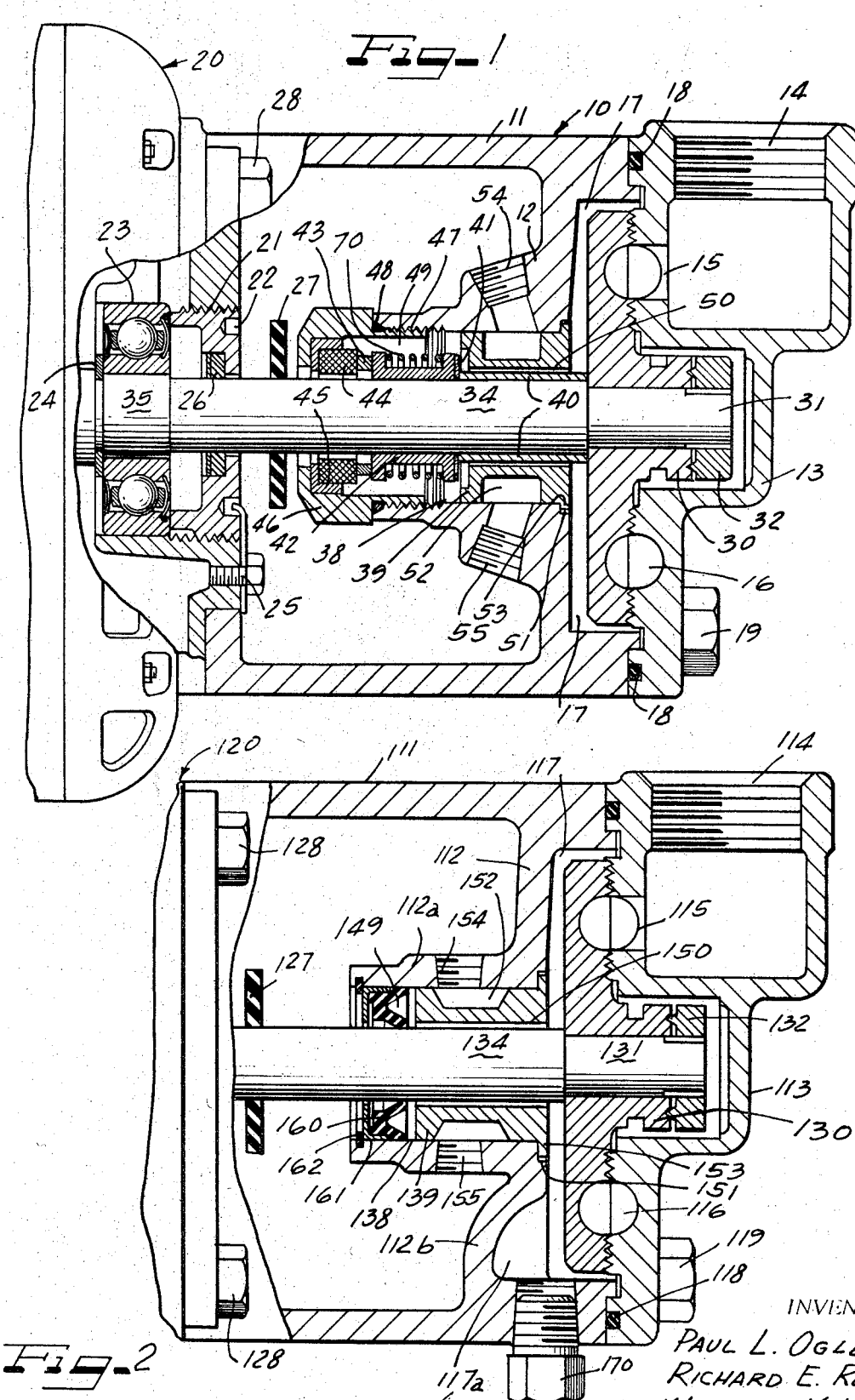

3,554,661
HIGH TEMPERATURE PUMP
Paul L. Oglesby, Moweaqua, and Richard E. Reeves and William K. Haebich, Decatur, Ill., assignors to Decatur Pump Company, Decatur, Ill., a corporation of Illinois
Filed Dec. 20, 1968, Ser. No. 785,556
Int. Cl. F04d 1/00, 29/00
U.S. Cl. 415—112                                   6 Claims

ABSTRACT OF THE DISCLOSURE

A restricted passageway between an impeller cavity area and a shaft seal cavity area in a high temperature pump allows a portion of the high temperature pumped fluid to be circulated to the shaft seal cavity area. A cooling jacket means located adjacent the passageway circulates a different cooled fluid to cool the portion of the high temperature fluid that passes through said restricted passageway to said shaft seal cavity area. Cool temperatures in the shaft seal cavity area allow the use of a simple and inexpensive shaft sealing means.

BACKGROUND OF THE INVENTION

Field of the invention

This invention generally relates to a pump construction for handling fluid of extreme temperatures. More particularly it encompasses the design of both turbine and centrifugal type pumps that will readily accommodate a wide range of fluids such as water or oil at high temperatures.

Description of the prior art

Pumps for high temperature fluids of 700° F. or more for example have been manufactured for some time, however, they have required expensive, and special modifications. Thus, for example, where the shaft seal was located adjacent the impeller area an expensive and exotic shaft seal combination such as metal bellows costing up to $150.00 for a ⅝" shaft size were required to give reliable field service.

In other constructions of the prior art a large water jacket integrally formed with the pump frame required a large flow of cooling liquid to cool the shaft area. In addition to increasing the size and weight of the pump because of the tremendous area that was required to be cooled, the pumps were inefficient in that they tended to cool the fluid being pumped, and required a large volume of cooling fluid.

Moreover, the pump frame having an integrally formed jacket had a limited use only for pumps wherein a fluid of extreme temperature was to be handled. Other pumps having cooling jackets allowed intermixture of the cooling fluid and the fluid being pumped with the result that the cooling fluid had to be substantially the same as that being pumped.

SUMMARY OF THE INVENTION

By contrast with the prior art, the pump construction of the present invention is simple, inexpensive and readily adaptable to widely varying conditions of use and production. By placing our seal in an area of relatively cool or moderate temperatures a seal costing only a few dollars provides the same or better performance than the very expensive seals presently being used. Pumping costs thus are in the same range as standard pumps. A separable throttle bushing lends intself to flexible and convenient construction. It provides easy variance in the size of the cooling fluid cavity provided while also making it possible to entirely eliminate any cooling fluid cavity in the pump.

Being able to eliminate the cooling channel through mere change of the throttle bushing allows standardization in the production and use of the pump. The ability to quickly vary the size and shape of the cooling channel depending upon present and future design conditions has the advantage that a pump may be rapidly converted from one fluid to another. A single frame may be used for a wide variety of pump designs. These and other advantages will become readily apparent in our pump construction which basically comprises a surrounding frame, a shaft rotatably mounted in the frame, an impeller cavity area, a shaft seal cavity area, a communicating passage extending between the impeller cavity area and the shaft seal cavity area and a fluid jacket that is located in the vicinity of the communicating passage.

The fluid jacket or cooling channel in our high temperature pump is separate from the impeller cavity area, the seal cavity area and the communicating passageway. Thus, the fluid jacket has first fluid inlet and outlet means not in communication with the above noted cavity areas and may circulate a first fluid in and through said fluid jacket. The fluid in the impeller cavity area, the communicating passageway and the seal cavity area comes in through a second fluid inlet and leaves through a second fluid outlet means thereby allowing the circulation of a second fluid in said areas.

The communicating passageway is restricted so that only a small portion of the second fluid may pass to said shaft seal cavity whereby when the first fluid is cool and the second fluid is hot said small portion of the second fluid will be cooled as it circulates through said communicating passage and into said shaft seal cavity area. The result is that the small portion of the second fluid in the shaft seal area will be substantially cooler than the larger portion of the second fluid circulating in and through the impeller cavity area. These substantially cooler temperatures in the shaft seal cavity allow the use of a conventional and relatively inexpensive seal means. This seal means of course encircles the shaft in the shaft seal cavity area. We have found a press fitted lip seal to give excellent results.

We have also found that standard face type seals commonly used in low temperature pumps give excellent results. Either lip type or face type shaft seals can be used, and are selected or recommended by the manufacturer to best suit a particular application.

The frame construction includes an internal shaft support portion having a bore. A throttle bushing having an outer surface and an inner surface is received in this bore with the outer surface of the throttle bushing conforming substantially to the bore. In addition, the outer surface of the bushing has a circumferentially oriented cavity which when enclosed by the bore forms a closed fluid tight channel. Inlet and outlet ports through the frame communicating with the fluid tight channel allow the channel to function as a fluid jacket. As will be further set out in the application, the communicating passage is of a cylindrical configuration and advantageously it is of great length with respect to its thickness. The communicating passageway is formed by the outer surface of the shaft or spacer and the inner bore of the throttle bushing and thus is positioned adjacent to the throttle bushing and the shaft.

BRIEF DESCRIPTION OF THE DRAWINGS

FIG. 1 is a cross-sectional view of one embodiment of the invention showing its relationship to a pump driving means.

FIG. 2 is a cross-sectional view of another embodiment of the invention.

DESCRIPTION OF THE PREFERRED EMBODIMENTS

There is shown in FIG. 1 a pump generally indicated at 10 attached to a driving or motor means 20. The frame of the pump 10 comprises an external casing 11, a internal shaft support portion 12 and a raceway portion 13. In practice, it has been found convenient to form the casing a cylindrical configuration, however, any appropriate shape may be used. Likewise the material from which the frame is made should be suitable to the design factors of strength, size and fluid to be handled. The raceway portion 13 may conveniently include an outlet raceway 14 that communicates with an outlet opening 15. An inlet that is not shown communicates with the impeller inlet area 16. The raceway portion 13 has a closure seal 18 around its perimeter and is connected to the casing 11 by conventional means such as a cap screw 19.

Driving means for the pump are generally indicated at 20. An impeller adjusting screw 21 serves to keep a ball bearing 23 firmly against a bearing backup washer 24 and permits axial adjustment of the motor shaft. A suitable adjustment means 22 is provided on the screw 21. A locking device for the adjusting screw may take the form of the screw mounted clip 25. A seal 26 may conveniently be used as a seal between the motor and the pump. The seal 26 may be accommodated in a recess of the adjusting screw 21.

A slinger washer 27 mounted on the shaft adjacent the shaft seal area causes any possible leakage or seepage through the pump seal to be radially propelled away from the shaft and thus away from possible intrusion into the motor area.

An impeller 30 is mounted in the impeller cavity area between the frame portions 12 and 13. The impeller, which may be of any appropriate configuration, is attached to a shaft impeller connection portion 31 and may be held in place by an impeller lock nut 32. The shaft impeller connection portion 31 is connected to or integral with a main shaft portion 34 which in turn is connected to a motor connection shaft portion 35. We have found it advantageous to make the shaft portions integral and thereby provide a direct connection between the driving means 20 and the impeller 30.

In the environment of the pump structure heretofore described but also applicable to other basic pump structures, we provide a novel means by which the basic pump structure may be readily and conveniently adapted to incorporate the pumping of fluid having extreme temperatures. While these temperature extremes may be hot or cold this embodiment is more particularly directed to high temperature pumps where the temperature may be 700° F. or more. As has been previously pointed out and as will become apparent, this construction has many advantages over the prior art.

The shaft support portion 12 of the frame perferably has a bore 38 therethrough. This bore may take any shape, however, we have found it convenient to provide a cylindrical bore. We press fit a mating throttle bushing 39 into the bore 38 so that a very close fluid tight fit is obtained. Other connections of the bushings 39 with the bore 38 that produce the same result may be used depending upon design criteria. It is important, however, that the fit be fluid tight for reasons as hereafter become readily apparent. The bushing material may be conventional bronze or may vary depending upon design requirements. The throttle bushing 39 will remain stationary with respect to the frame. A suitable bore is provided in the throttle bushing 39 through which the shaft portion 34 projects.

Located about the outer surface of the shaft portion 34 is a cylindrical seal spacer 40 having one end bearing against the impeller 30 and other end abutting a washer 41 adjacent to the rotating member of a shaft seal 42 whereby the shaft seal is kept at a constant distance from the impeller. The rotating member of the shaft seal 42 encircles the shaft portion 34 and abuts the opposite side of the washer 41. A sealing element 43 bears against the upstanding flange of the seal 42. A spring 70 may be provided between the upstanding flange and the washer 41 to maintain tight contact. A seat or sealing member 44 seated in an L-shaped elastomer seal seat 45 is held in bearing relationship against the sealing element 43 by a gland 46. A threaded engagement of the gland 46 with the frame portion 12 properly positions the sealing elements 40 through 45 and a ring gasket 48 seals the shaft seal cavity area at this point.

The space between the outside diameters of the sealing members 41 through 44 and the inside diameter of the stationary seat 46 and the frame portion 12 forms a shaft seal cavity area 49. Also the area between the outside diameter of the spacer 40 and the inside diameter of the throttle bushing 39 forms a communicating passage 50 extending between the shaft seal cavity 49 and the impeller cavity area 17. The passageway 50 is of such a dimension as to permit only a filmlike thickness of fluid to flow between the impeller cavity 17 and the shaft seal cavity 49. Thus, although there is a great flow of fluid through the pump impeller passage 16, the flow to and from the shaft seal area 49 is a very small percentage of this.

The throttle bushing 39 is configured such that it has a fluid cavity 52 formed therein. As shown, this cavity takes the form of a channel in the outer surface of the throttle bushing and the enclosing surface is provided by the interior surface of the bore 38. This, of course, is but one embodiment and it is envisioned that this cavity may take other forms. Communicating with the cavity 52 is a fluid inlet port 54 and a fluid outlet port 55 which have threaded portions for receiving tubing (not shown) that will carry a fluid through the cavity 52. In the case where the pump is pumping a very hot fluid it is envisioned that the fluid passing through the cavity 52 will be a cooling fluid. Also if the fluid being pumped is cold it may be expected that the fluid in the cavity 52 would be a warm fluid.

As has been previously set out the throttle bushing 39 is press fitted in the bore 38 to that the cavity 52 is completely fluid tight. In addition to ensure that the pressurized fluid in the impeller cavity 17 will not enter the cavity 52 we have provided a pressure seal flange 53 on the throttle bushing which is seated on a pressure seal surface 51 of the frame portion 12. This additional flange 53 is pressed against the surface 51 in a direct relation to the pressure in the impeller cavity 17. Thus the advantages obtained are that as the pressure in the cavity 17 increases so does the sealing pressure between the flange 53 and the surface 51. The flange also gives positive location in bore 38 of the bushing 39 so that cavity 52 is located properly in relation to inlet 54 and outlet 55.

It has been common in the past to place the shaft seal at a point on the shaft adjacent the impeller cavity. With the temperatures of the fluid in the impeller cavity in the range of 700° F. or more and the impeller operating at high speeds, a seal located in this area was subjected to extremely high temperatures caused not only by the fluid but also by the pump shaft friction. This made it necessary to provide an expensive metal bellows type seal for effective sealing. Moreover, lubrication was a problem as was the great possibility that the lubricating fluids would mix with the fluid being pumped.

There was thus a great need for a sealing means which was very effective and yet much less expensive than what was heretofore know. As a solution to this problem, we have developed a very versatile inexpensive and convenient sealing means which has been found to provide excellent results.

We have discovered that placing the seal in the areas where the temperatures are not so high as that of the pump fluid provides the advantages of simpler and less expensive seal construction. We have thus removed the seal means from the area adjacent the impeller cavity in FIG. 1 and interposed a cooling means. Moreover, a distinct feature of this invention is that while the fluid being pumped is being used as a lubricating means for the shaft, the pump fluid in the region of the seal means is effectively reduced in temperature so that no special seals means are required. Further, it is a great advantage to this invention that the amount of the "pumped" fluid that is cooled is very small in comparison to the total volume being pumped. This latter feature is made possible by the restriction of the fluid passing from the impeller cavity area 17 to the shaft seal area 49 to a filmlike amount sufficient to meet the requirements of lubrication. As the fluid passes from the impeller cavity 17 to the shaft seal cavity 49 it comes in direct contact with the throttle bushing 39 which has been cooled by the fluid passing through the cavity 52. Inasmuch as the volume of fluid passing through the cavity 52 is great in comparison to the fluid passing through the passageway 50, the fluid in the passage 50 is greatly reduced in temperature. Moreover, this effectiveness may be increased by increasing the specific heat factor of the cooling liquid. This is possible since the fluid in the cavity 52 will not mix with the pumped fluid.

In operation the incoming fluid of a temperature of 700° F. or more will enter through an inlet not shown, will travel in the area 16 and be forced out the opening 15 to enter the desired system at 14. Some fluid in the impeller cavity 17 will circulate through the communicating passageway 50 and into the shaft seal cavity 49 where the seal is provided. As the fluid passes through the passageway 50 it contacts the throttle bushing 39 which has been cooled by a different fluid in the fluid cavity 52 so that as the pumped fluid passes for a relatively long period through the communicating passageway it is cooled from the temperatures of 700° F. or more or a temperature of about 200° F. to 100° F. in the shaft seal cavity depending on the temperature and quantity of flow through cavity 52. This great difference in temperature is possible because the communicating passageway is relatively restricted and because there is not through flow but merely a circulating flow between the impeller cavity 17 and the shaft seal cavity 49.

We are cooling a very thin film of liquid by restricting the flow and circulation of the liquid to be cooled rather than trying to cool a large body of liquid as is done in the conventional jacket pumps heretofore mentioned. In this way we can greatly reduce the size and mass of our novel pump over other designs. Another advantage of our pump construction is that the flow and type of the cooling liquid in the passageway 50 may be varied readily at the choice of the user depending upon the results desired. In addition this cooling fluid may be less expensive material and in some instances may very advantageously be taken from a tap water supply. Moreover, this tap water need not be pure but may contain impurities since there is no concern that such cooling fluid will be mixed with the hot fluid.

The references to inlet and outlet on the cooling system but not the pumping system are for purposes of illustration and may be reversed in actual practice.

A second embodiment of our invention is shown in FIG. 2.

The principal difference between the embodiments of FIGS. 1 and 2 is in the sealing means provided. FIG. 2 illustrates a lip type seal that is press fitted into the bore of 138. A drain means 117a is shown in the impeller cavity area in this embodiment although a drain means would also be provided in the pump of FIG. 1.

With the exception of the seal, the construction of the pump generally indicated at 110 is substantially the same as that shown in FIG. 1 and thus most numbers are merely prefixed with a "1." Again the pump frame comprises an external casing 111, an internal shaft support portion 112, 112a, 112b, and a raceway portion 113 having a raceway 114 that communicates with the impellerr 130, a raceway 114 and an outlet port 115. In this embodiment the enlarged cavity portion 117a facilitates the provision of a drain plug 170. As before, the raceway portion 113 is secured to the frame by a suitable fastening means 119. A seal 118 in the joining surface prevents possible leakage of the high pressure fluid.

The pump 110 is attached to a power supply 120 by suitable fastening means 128. The ball bearing and impeller adjusting screw is not shown for this embodiment but it may be the same as that shown for FIG. 1. A shaft 134 connected at one end to the operating means 120 projects through the bore 138 of the pump frame and has the impeller 130 attached at its outer end 131 by the impeller lock nut 132. A throttle bushing 139 is pressed fitted into the bore 138 so that the throttle bushing flange 153 is seated firmly against the sealing surface 151 in the pump frame portion 112 surrounding the bore 138. A fluid cavity 152 is shown in the throttle bushing 139. This fluid cavity may be of a trapezoidal or other acceptable cross-sectional configuration. The interior surface of the bore 138 provides the closure surface for the pump cavity 152 and because of the press fit forms a fluid type passageway preferably extending completely around the shaft 134. Ducts (not shown) for conveying the cooling fluid to and from the cavity 152 are connected to an inlet port 154 and an outlet port 155 by suitable means such as a threaded engagement.

In this embodiment the sealing means may be a conventional press fitted lip seal such as is made by Johns-Manville for example, although it is to be understood there are other styles and designs which give good service. This seal is of a V-shaped cross-sectional configuration in the area between the bore and shaft. It is made of a "Viton" elastomer that in some cases may be supported by an additional securing means such as a Teflon wedge adjacent the shaft 134. A right angle seal supporting ring 161 supports the portion of the seal in contact with the frame bore. A snap locking ring 162 is effective in holding the support ring and seal firmly in place around the shaft 134. Although the shaft seal cavity 149 appears smaller in this embodiment than it does in FIG. 1, the pump frame portion 112a may be extended to enlarge this pump seal cavity area in accordance with design requirements.

The seal 160 and the support frame 161 are inserted into the bore 138 in a direction opposite to that of the throttle bushing 139 thereby closing off an area 149 which serves as a fluid type seal cavity area. As in the prior embodiment any fluid possibly escaping through the seal and moving along the shaft towards the motor or operating means will be spun off by the slinger washer 127.

Operation of this embodiment is substantially the same as the embodiment set out in FIG. 1. The fluid being pumped enters through an inlet not shown, moves into the area 116 and goes out through the port 115 and outlet 114. Of the fluid in the impeller cavity 117, a very small portion of the pumped fluid circulates through the communicating passageway 150 into the shaft seal cavity 149. As the ordinarily hot fluid passes through said fluid passageway it contacts the throttle bushing 139 which in turn is being cooled by the cooler fluid passing through the fluid cavity 152. Thus here, as in the prior embodiment, the normally hot fluid of 700° F. or more is cooled down considerably to a temperature of about 200° F. to 100° F. in the pump seal cavity area 149 depending on the temperature and quantity of flow through cavity 152. This great reduction in temperature allows the use of a conventional seal such as that illustrated in this embodiment.

In summary the following advantages over the prior art are readily apparent. Of foremost importance when considering the extreme temperatures under which this pump has been designed to operate is the fact that the construction has been extremely simplified. Specifically, an expensive jacketing arrangement has been eliminated. Incorporating the cooling fluid cavities in the separate throttle bushing allows the use of a standard pump frame for designs of different cooling capacities and shaft size. Thus, if it is desired for design purposes to vary the cooling capacity a standard size pump frame may be used with merely the throttle bushing being changed. Likewise, where a different shaft size is required, a mere change in the throttle bushing is all that is required. For designs which require no cooling the same standard pump frame may still be used by simply inserting a throttle bushing with no cavity therein. An important feature of this mechanical design recognizes that any shaft seal is subject to periodic failure, and therefore, field service at a reasonable cost is extremely important to the user.

Restricting the fluid flowing from the impeller cavity chamber to the shaft seal chamber to a filmlike layer which is directly adajacent to the cooling portion, results in extremely effective cooling. The seal cavity area may be kept as low as 100° F. to 200° F. with fluid of 700° F. or more being circulated in the pumping chamber. Further, a wide temperature range of operation can be accommodated by this unit due to the extremely efficient efficient nature of the design. The cooler temperatures in the area of the shaft seal permit the use of a standard lip and face type seals rather than the heretofore used expensive, exotic shaft seals.

Separation of the cooling area from the hot pumped fluid area permits use of cooling fluids that do not have to be cleaned, treated or free of contaminants since there is no direct contact between the pumped fluid and the cooling liquids. The versatility permitted by the ready interchangeability of the various pump members permits pumping hot oil, hot water and many other fluids with minor modifications of the basic pump unit. The high temperatures of the fluid being pumped are not transmitted along the shaft to the motor bearings and windings, because the cooling fluid through the cooling jacket cavity serves to dissipate the heat normally transmitted along the shaft. Therefore, standard motors having standard bearing grease and conventional wire insulation can be used. The advantages associated with standardization and the elimination of special pumps are thus clearly made possible by our invention.

Although minor modifications might be suggested by those versed in the art, it should be understood that we wish to embody within the scope of the patent warranted hereon all such modifications as reasonably and properly come within the scope of our contribution to the art.

We claim as our invention:

1. A pump having a frame, a shaft, said shaft rotatably mounted in said frame, said frame having an impeller cavity area, a shaft seal cavity area, a communicating passage extending between said impeller cavity area and said shaft seal area, a fluid cooling jacket, said fluid cooling jacket being located in the vicinity of said communicating passage, said shaft being connected to an impeller means in said impeller cavity area, a spacer positioned about said shaft extending through said communicating passage and forming a continuously open restricted flow path between said jacket and said spacer between said impeller cavity and said seal cavity, a shaft seal means in said shaft seal cavity area, said spacer having a forward end and a rearward end, said forward end abutting said impeller means, and said rearward end abutting said shaft seal means.

2. A pump according to claim 1 wherein said shaft seal means comprises a rotating member and a stationary member, a seal retaining means holding said rotating and stationary seal members and said spacer in their abutting sealing relationship with each other and with the impeller.

3. A pump according to claim 2 wherein said frame has a rearwardly projecting portion surrounding said fluid jacket and a portion of said shaft, said rearwardly projecting portion having internal screw threads therein and said seal retaining means threadedly engaging said rearwardly projecting portion.

4. A pump according to claim 1 wherein said frame includes an internal support portion having a bore wherein said jacket comprises, a throttle bushing being received in said bore, said throttle bushing having an outer end adjoining said impeller cavity area, said outer end having a peripheral seal surface on the frame internal support portion.

5. A pump according to claim 1, wherein said fluid jacket has first fluid inlet and outlet means not in communication with said impeller cavity area or said shaft seal area whereby a first fluid may circulate in and through said fluid jacket, said impeller cavity area has second fluid inlet and outlet means whereby a second fluid may circulate in and through said impeller cavity, through said communicating passage and in said shaft seal cavity, said communicating passageway being restricted so that only a small portion of said second fluid may pass to said shaft seal cavity whereby when said first fluid is cool and said second fluid is hot said small portion of said second fluid will be cooled as it circulates through said communicating passage and into said shaft seal acvity area so that the small portion of the second fluid in said shaft seal area will be substantially cooler than the larger portion of said second fluid circulating in and through said impeller cavity area, said substantially cooler temperatures in said shaft seal cavity allowing the use of an inexpensive seal means.

6. A pump according to claim 5, wherein said communicating passage is of a cylindrical configuration and is of great length with respect to its thickness.

References Cited

UNITED STATES PATENTS

| | | | |
|---|---|---|---|
| 2,364,168 | 12/1944 | Shallenberg | 103—96 |
| 2,684,033 | 7/1954 | Montgomery et al. | 103—111 |
| 2,680,409 | 6/1954 | Sebens | 103—111 |
| 2,768,849 | 10/1956 | Riesing | 103—111 |
| 2,864,314 | 12/1958 | Culleton | 103—96 |

FOREIGN PATENTS

| | | | |
|---|---|---|---|
| 114,725 | 10/1929 | Austria | 103—111 |
| 1,266,714 | 6/1961 | France | 103—96 |

HENRY F. RADUAZO, Primary Examiner

U.S. Cl. X.R.

415—177